(12) United States Patent
Chew et al.

(10) Patent No.: US 9,379,650 B2
(45) Date of Patent: Jun. 28, 2016

(54) ENHANCED INDUCTIVE SENSE USING MUTUAL INDUCTANCE

(71) Applicant: STMicroelectronics Asia Pacific Pte Ltd, Singapore (SG)

(72) Inventors: Wei Seng Chew, Singapore (SG); Wei Xiong, Singapore (SG)

(73) Assignee: STMICROELECTRONICS ASIA PACIFIC PTE. LTD., Singapore (SG)

(*) Notice: Subject to any disclaimer, the term of this patent is extended or adjusted under 35 U.S.C. 154(b) by 79 days.

(21) Appl. No.: 14/248,784

(22) Filed: Apr. 9, 2014

(65) Prior Publication Data

US 2015/0295526 A1    Oct. 15, 2015

(51) Int. Cl.
*H02P 6/18* (2016.01)
*H02P 21/14* (2016.01)
*H02P 6/22* (2006.01)

(52) U.S. Cl.
CPC ............. *H02P 6/186* (2013.01); *H02P 6/182* (2013.01); *H02P 6/185* (2013.01); *H02P 6/22* (2013.01); *H02P 21/146* (2013.01)

(58) Field of Classification Search
CPC ......... H02P 6/185; H02P 6/22; H02P 21/146; H02P 21/0053; H02K 29/12
USPC ....................................................... 318/400.33
See application file for complete search history.

(56) References Cited

U.S. PATENT DOCUMENTS

| 5,254,914 A * | 10/1993 | Dunfield et al. ......... 318/400.34 |
| 6,555,977 B1 * | 4/2003 | Du et al. .................. 318/400.04 |
| 2008/0143282 A1 | 6/2008 | Plutowski |

* cited by examiner

*Primary Examiner* — Kawing Chan
*Assistant Examiner* — Bradley Brown
(74) *Attorney, Agent, or Firm* — Allen, Dyer, Doppelt, Milbrath & Gilchrist, P.A.

(57) ABSTRACT

Methods and apparatus for determining rotor position in a motor including a rotor and stator windings. The method includes measuring inductive sense values for each pair of the stator windings by performing an inductive sense routine on the motor, measuring stator winding voltage values, induced by mutual inductance between windings, for each of the stator windings by performing a mutual inductance sensing routine on the motor, and determining the rotor position based on the inductive sense values and the stator winding voltage values.

14 Claims, 14 Drawing Sheets

ENHANCED INDUCTIVE SENSE USING MUTUAL INDUCTANCE

BACKGROUND

1. Technical Field

This disclosure relates to electric motors and, more particularly, to sensing the initial position of the rotor of a brushless DC motor while the rotor is stationary.

2. Discussion of Related Art

A basic three-phase brushless DC(BLDC) motor includes a permanent magnet rotor and three stator windings. The windings are energized with appropriate currents and phase relationships to produce a rotating field which causes rotation of the rotor. In a typical configuration, the motor windings are energized with a 120° phase relationship between the currents of the three windings.

In order to obtain rotation of the rotor, the stator windings are energized and de-energized in a sequence that relates to the current position of the rotor. Accordingly, the motor position is sensed during operation, and the sensed motor position is used to control a commutation sequence for energizing the stator windings. In one approach, pulse-width-modulated (PWM) signals are applied to the motor windings according to the sensed motor position.

Known techniques for sensing motor position include mounting position sensors within the motor. Other known techniques include measurement of back electromotive force (BEMF) but this requires the rotor to be rotating at sufficiently high speed in order for the BEMF to be detectable. Before we can even start rotating the rotor, it is crucial to determine its initial position so that the correct first phase is energized to avoid back rotation or stalling of the rotor. One widely used technique to determine the initial position is known as inductive sense. However, inductive sense accuracy is affected by the mismatch between the phases of the motor coils in terms of resistance and inductance and the current limit measurement apparatus.

Manufacturing BLDC motors and/or measurement apparatus with tight tolerance is both high in cost and complexity. Accordingly, there is a need for improved methods that are more tolerant to these manufacturing defects.

SUMMARY

According to a first aspect, a method is provided for determining rotor position in a motor including a rotor and stator windings. The method comprises measuring inductive sense values for each pair of the stator windings by performing an inductive sense routine on the motor, measuring stator winding voltage values, induced by mutual inductance between windings, for each of the stator windings by performing a mutual inductance sensing routine on the motor, and determining the rotor position based on the inductive sense values and the stator winding voltage values.

In embodiments, measuring inductive sense values comprises determining a time for a current through each pair of the stator windings to reach a current limit.

In embodiments, determining the time to reach a current limit comprises sensing a voltage across a single sense resistor associated with the stator windings.

In embodiments, determining the time to reach a current limit comprises sensing a voltage across sense resistors associated with respective stator windings.

In embodiments, measuring stator winding voltage values comprises determining if a winding voltage is positive or negative when a current is supplied through two other stator windings.

In embodiments, determining the rotor position comprises accessing an entry in a table based on the inductive sense values and the stator winding voltage values.

In embodiments, the motor includes three stator windings and measuring inductive sense values includes measuring six inductive sense values.

In embodiments, the motor includes three stator windings and measuring stator winding voltage values comprising measuring six stator winding voltage values.

In embodiments, measuring stator winding voltage values comprises supplying a current through a pair of the stator windings and measuring a voltage across a third winding of the stator windings.

In embodiments, measuring the voltage across the third winding comprises determining zero crossings of the voltage across the third winding.

According to a second aspect, a method is provided for determining rotor position in a motor including a rotor and three stator windings. The method comprises: measuring inductive sense values for each pair of the stator windings by determining a time for a current through each pair of stator windings to reach a current limit; measuring stator winding voltage values, induced by mutual inductance between windings, for each of the stator windings by supplying a current through a pair of the stator windings and measuring the zero crossings of a voltage across a third winding of the stator windings; and determining the rotor position by accessing an entry in a table based on the measured inductive sense values and the measured stator winding voltage values.

According to a third aspect, apparatus is provided for determining rotor position in a motor including a rotor and stator windings. The apparatus comprises: first circuitry configured to measure inductive sense values for each pair of the stator windings by performing an inductive sense routine on the motor; second circuitry configured to measure stator winding voltage values, induced by mutual inductance between windings, for each of the stator windings by performing a mutual inductance sensing routine on the motor; and processing circuitry configured to determine the rotor position based on the inductive sense values and the stator winding voltage values.

BRIEF DESCRIPTION OF THE DRAWINGS

For a better understanding of the embodiments, reference is made to the accompanying drawings, which are incorporated herein by reference and in which.

DETAILED DESCRIPTION

Figure 1:
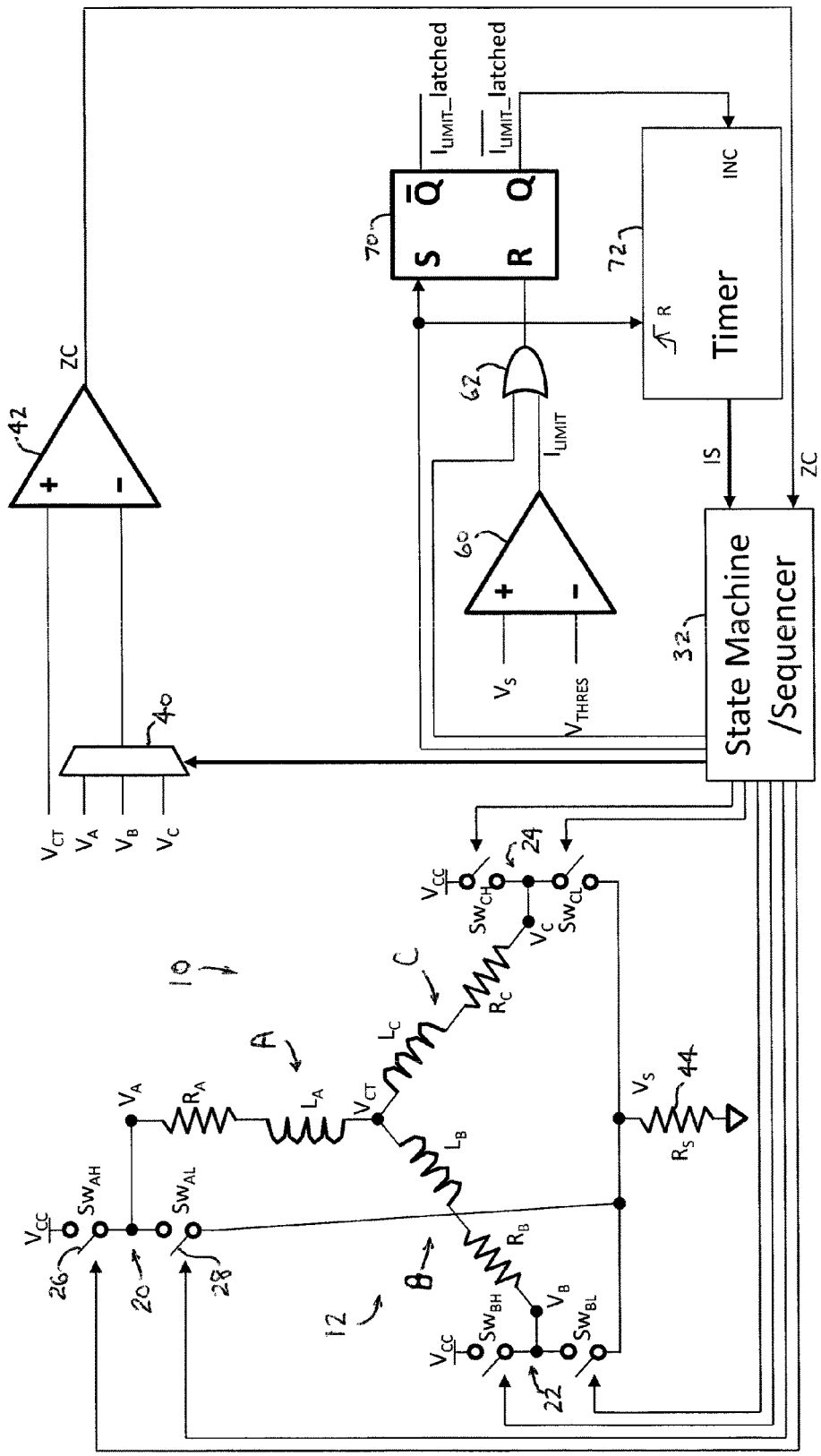
FIG. 1 is a schematic block diagram of a three-phase BLDC motor system with one current sense resistor.
Figure 2:
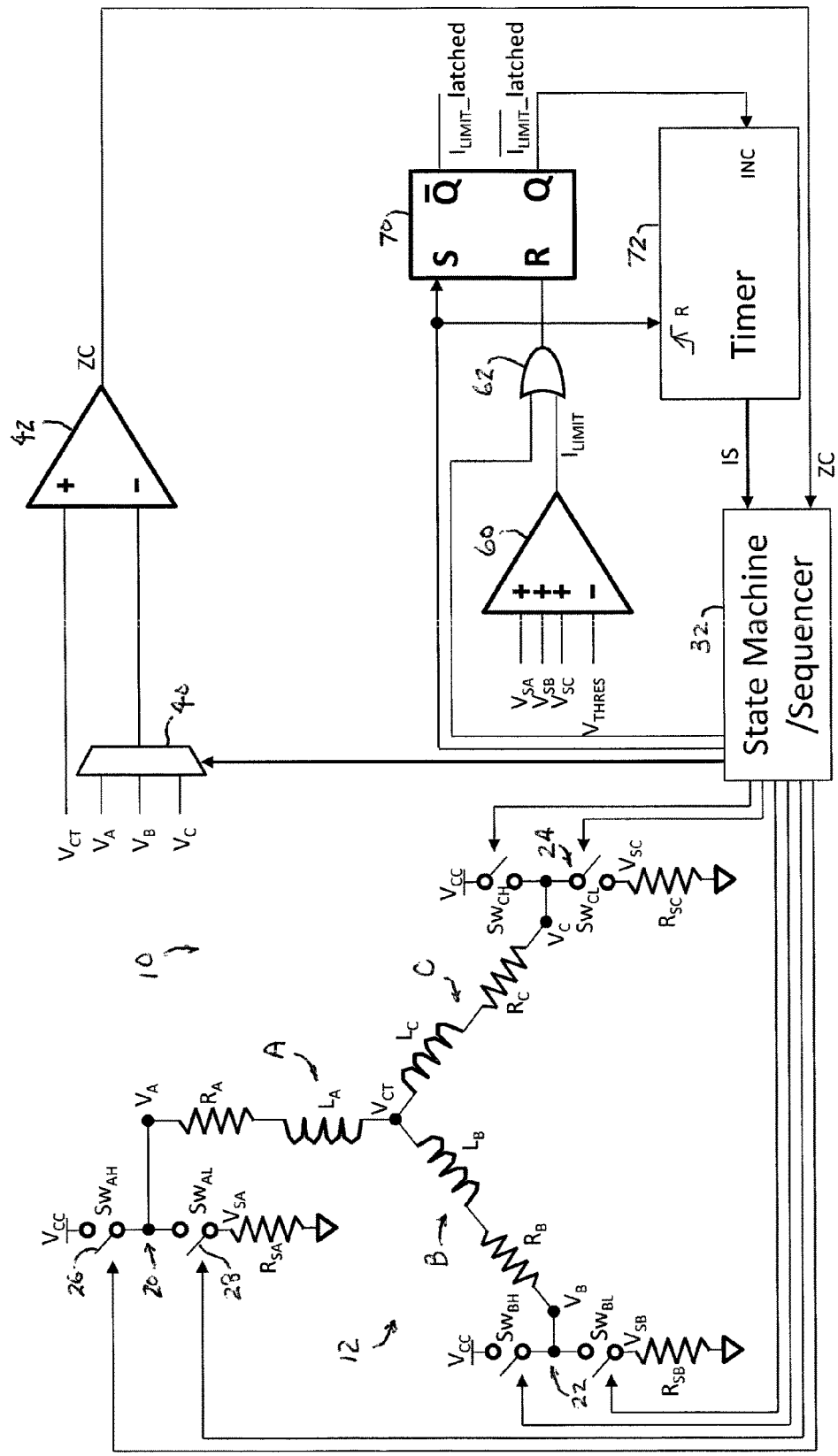
FIG. 2 is a schematic block diagram of a three-phase BLDC motor system with three current sense resistors.

A schematic block diagram of a motor system 10 is shown in FIGS. 1 and 2. FIG. 1 illustrates a motor system with a single sense resistor Rs, and FIG. 2 illustrates a motor system with three sense resistors Rsa, Rsb, and Rsc. In FIGS. 1 and 2, a BLDC motor 12 is represented schematically by stator windings A, B and C, each having one end connected to a center tap 14. Stator winding A is represented by a series connection of an inductor LA and a resistor RA; stator winding B is represented by a series connection of an inductor LB and a resistor RB; and stator winding C is represented by a series connection of an inductor LC and a resistor RC. The motor 10 also includes a permanent magnet rotor (not shown).

The opposite ends of stator windings A, B and C are connected to drive circuits 20, 22 and 24, respectively. Each drive circuit 20, 22, 24 includes a switch 26 coupled to a supply voltage +VCC and a switch 28 coupled to ground. Each of the stator windings A, B and C can be connected by switch 26 to voltage +VCC or by switch 28 to ground. The drive circuits 20, 22 and 24 are controlled by a state machine/sequencer 32.

Each of the stator windings A, B and C is coupled to an input of a multiplexer 40 which receives a control input from state machine/sequencer 32. A selected winding signal is provided by multiplexer 40 to a negative input of a comparator 42. The center tap 14 of the stator windings is coupled to a positive input of comparator 42, and the output of comparator 42 is supplied to state machine/sequencer 32.

In the embodiment of FIG. 1, a single sense resistor 44 (RS) is utilized for inductive sensing of each winding pair. An embodiment using three current sense resistors is shown in FIG. 2. In particular, a sense resistor 80 (RSA), connected between drive circuit 20 and ground, senses the current in winding A; a sense resistor 82 (RSB), connected between drive circuit 22 and ground, senses the current through winding B; and a sense resistor 84 (RSC), connected between drive circuit 24 and ground, senses the current through winding C. Use of a single sense resistor, as shown in FIG. 1, avoids a mismatch between three separate sense resistors. However, in some embodiments, the resistance of the switch connecting the winding to ground can be used as the sense resistor.

In FIG. 1, the voltage VS corresponds to a voltage across sense resistor RS when the total current flows through switches 28 of drive circuits 20, 22 and 24 and through resistor RS to ground. The motor system 10 of FIG. 1 further includes a comparator 60 to sense the current limit Ilimit during inductive sensing. In particular, comparator 60 receives voltages VS at a positive input. The positive input is then compared with a threshold voltage VTHRES supplied to a negative input of comparator 60.

In FIG. 2, the voltage VSA corresponds to a voltage across sense resistor RSA when current flows through switch 28 of drive circuit 20 and through sense resistor RSA to ground. The voltage VSB corresponds to a voltage across sense resistor RSB when current flows through switch 28 of drive circuit 22 and through sense resistor RSB to ground. The voltage VSC corresponds to a voltage across sense resistor RSC when current flows through switch 28 of drive circuit 24 and through sense resistor RSC to ground. Likewise, when switch 28 of drive circuit 20, 22 or 24 is open, no current flows through sense resistor RSA, RSB or RSC, respectively, and as such, voltage VSA, VSB or VSC becomes 0.

The motor system 10 of FIG. 2 further includes comparator 60 to sense the current limit Ilimit during inductive sensing. In particular, comparator 60 receives voltages VSA, VSB and VSC at respective positive inputs. The sum of the inputs is compared with threshold voltage VTHRES supplied to a negative input of comparator 60.

In FIGS. 1 and 2, the threshold voltage VTHRES applied to the negative input of comparator 60 corresponds to the current limit Ilimit. The output of comparator 60 is supplied through an OR gate 62 to a reset input of a SR latch 70 so that SR latch 70 is reset by a current limit event. SR latch 70 is also reset when the state machine/sequencer 32 provides a signal through OR gate 62.

In the discussion that follows, it is assumed that the embodiment of FIG. 2 with three separate sense resistors is utilized. In any case, sense resistors RSA, RSB, RSC and voltages VSA, VSB, VSC shown in FIG. 2 can be replaced by sense resistor RS and voltage VS in FIG. 1.

A start signal from state machine/sequencer 32 is applied to a set input of SR latch 70 and to a reset input of a timer 72. The start signal from state machine/sequencer 32 indicates the start of a current pulse applied to a pair of the windings A, B and C, such as windings B and C. A Q output of SR latch 70 is applied to timer 72 as an increment input.

In operation, the state machine/sequencer 32 supplies a current pulse through a winding pair, such as windings B and C. In the example of windings B and C, switch SWBH of switch 22 is closed to connect winding B to voltage +VCC and switch SWCL of switch 24 is closed to connect winding C to ground. The current through windings B and C begins to increase and produces a voltage VSC across sense resistor RSC. The winding current I is given by I=VSC/RSC. The sense voltage VSC (FIG. 2) is applied to the positive input of comparator 60. When the voltage VSC is greater than the threshold voltage applied to the negative input of comparator 60, the comparator 60 produces an output logic signal Ilimit which resets latch 70 and causes the increment input of timer 72 to go low, hence stopping timer 72. The timer count when timer 72 is stopped is an inductive sense count IS supplied to state machine/sequencer 32.

Comparator 42 senses the zero crossings of the voltage between one of the windings A, B and C and the center tap 14. The comparator 42 senses an ETON signal and provides an output ZC which changes state on the zero crossings of the ETON signal. The ETON signal for winding A can be represented as ETON=VA−VCT, (LAB−LAC)dI/dt, where VA is the voltage on winding A, VCT is voltage on center tap 14, LAB is the mutual inductance of windings A and B, LAC is the mutual inductance of windings A and C, and dI/dt is the rate of change of the current through windings B and C. The ETON signals for windings B and C can be represented in a corresponding manner. The comparator output ZC is supplied to the state machine/sequencer 32.

In operation, the drive circuits 20, 22, 24 supply pulses to each of the windings A, B and C, with the pulse timing and the pulse widths determined by a PWM generator within the state machine/sequencer 32, to cause rotation of the rotor (not shown). The state machine/sequencer 32 provides the timing of the drive signals based on the sensed signals from comparator 42.

Figure 3:
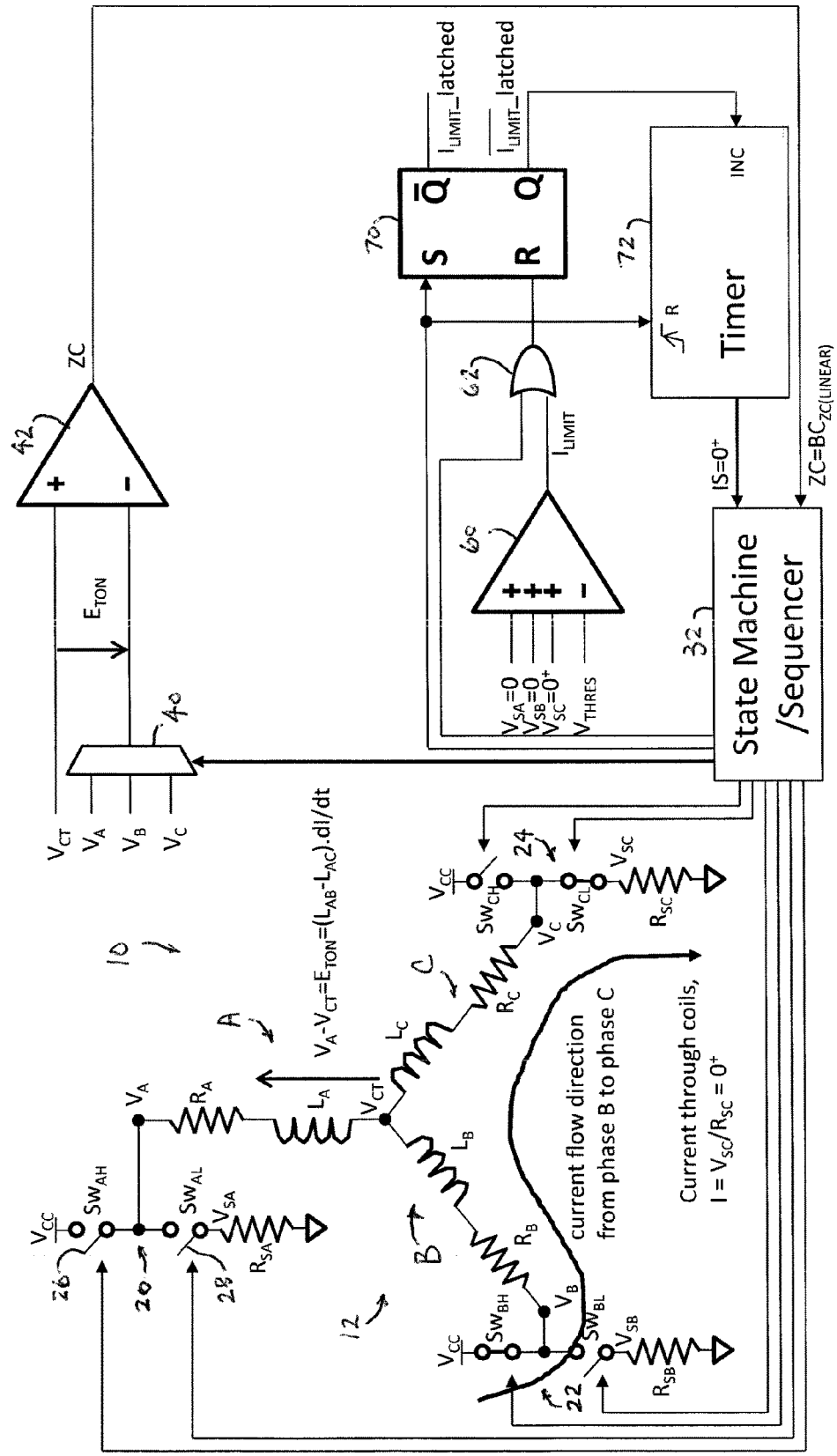
FIG. 3 is a schematic block diagram of a BLDC motor system performing inductive sense of the BC pulse at the instant $\Delta t$ time after the phases are being driven.
Figure 4:
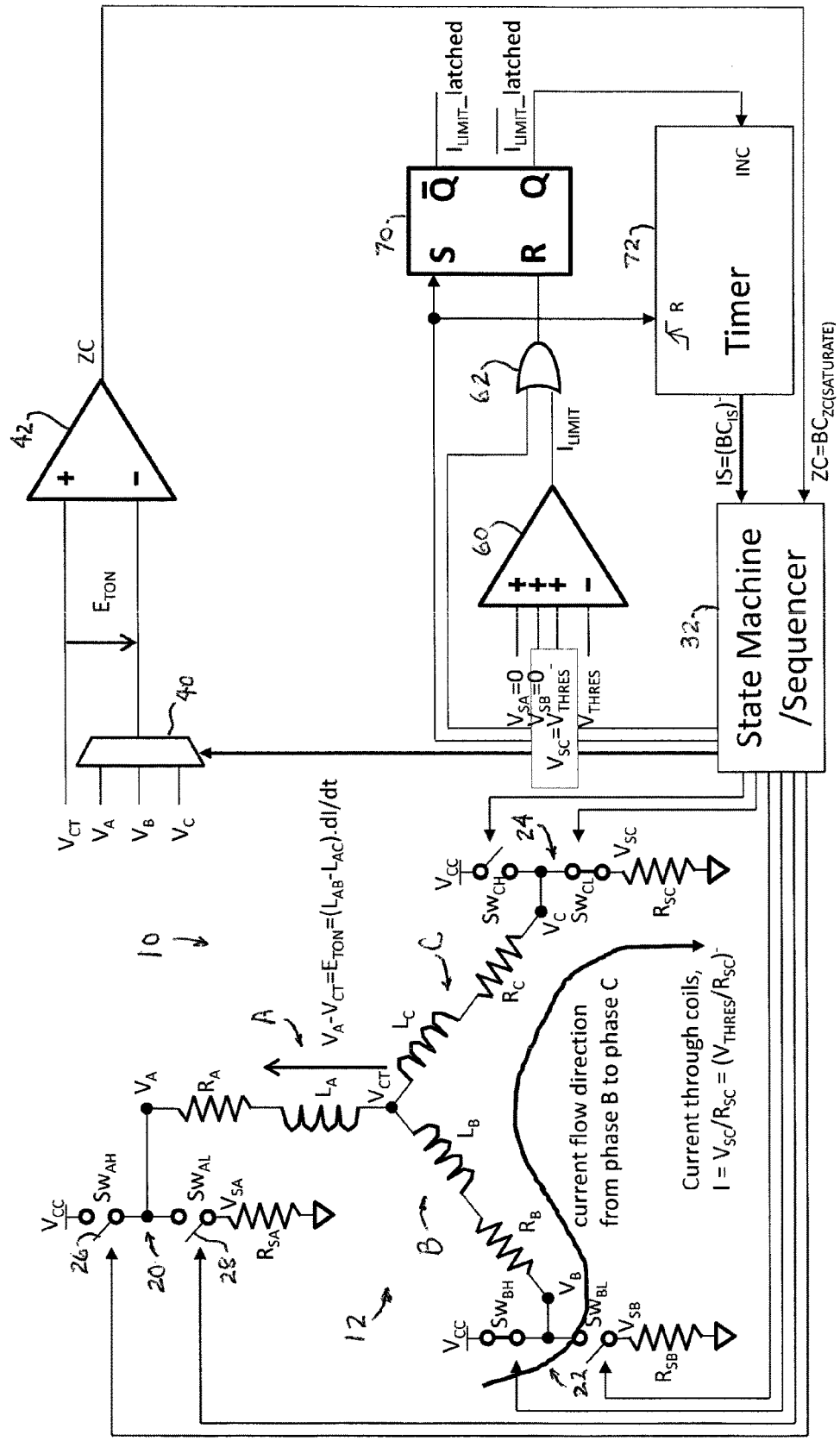
FIG. 4 is a schematic block diagram of a BLDC motor system performing inductive sense of the BC pulse at the instant $\Delta t$ time before the current limit Ilimit is reached.

A simplified schematic diagram of a BLDC motor system performing inductive sense of the BC pulse at the instant Δt time after the phases are driven is shown in FIG. 3, where time Δt (typically a few μs) represents a short duration of time such that the current built up in the motor coil is small, yet sufficiently long that the driver switch is fully closed. FIG. 4 is similar to FIG. 3 but shows the BLDC motor system performing inductive sense of the BC pulse at the instant before the current limit Ilimit is reached. At the higher current of FIG. 4, the magnetic core of the windings is more saturated than at the lower current of FIG. 3.

In both FIGS. 3 and 4, the comparator 42 senses the voltage across stator winding A when a current is supplied through stator windings B and C by coupling stator winding B to supply voltage +VCC and coupling stator winding C to ground. The comparator 42 receives the winding signal ETON, which is the voltage induced in winding A due to the change of current through windings B and C. For the configuration shown in FIGS. 3 and 4, the comparator 42 detects the zero crossings of the winding A signal ETON when windings B and C are energized and outputs zero crossing signal $BC_{ZC}$. Zero crossing signal CBzc is obtained from comparator 42 when the current direction through windings B and C is reversed. In a similar manner, zero crossing signals BAzc, ABzc, ACzc, and CAzc are obtained by changing the windings that are energized and the winding connected to comparator 42.

Figure 5:
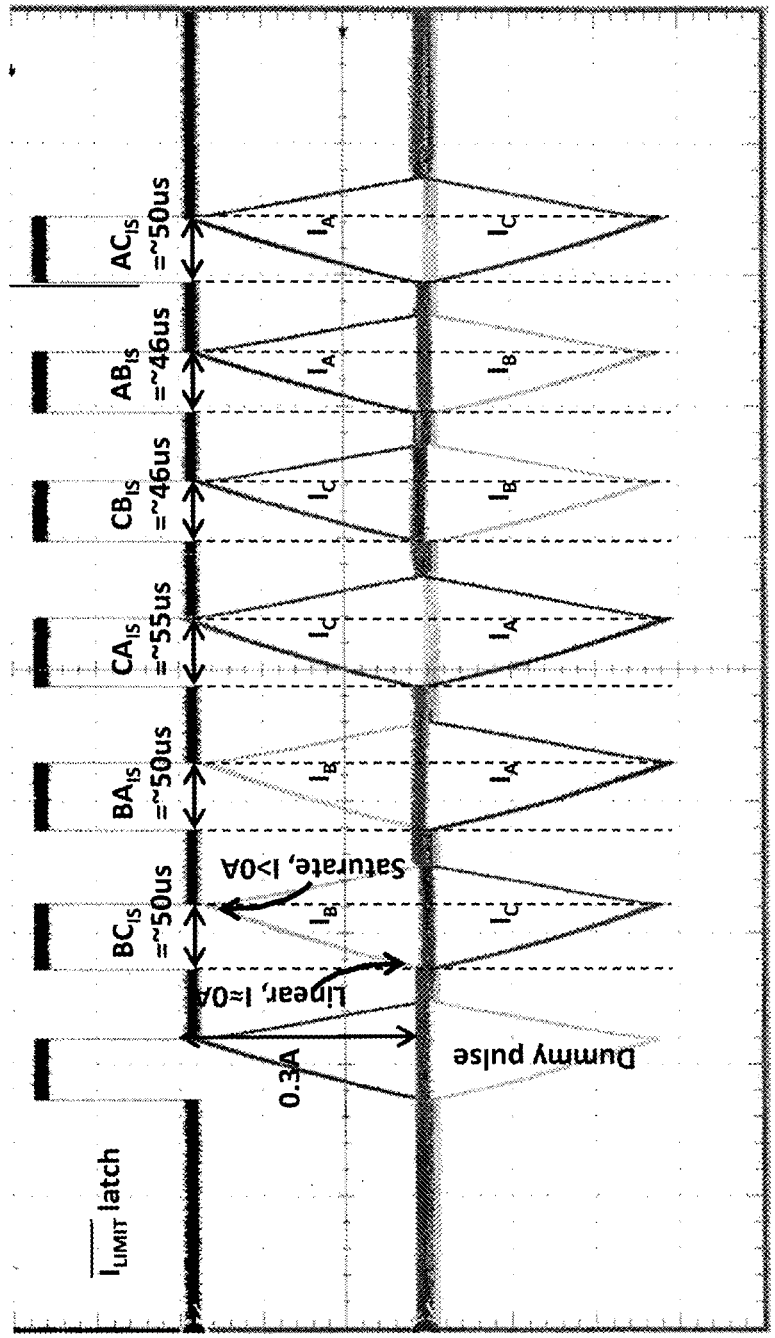
FIG. 5 shows the BLDC motor winding current profile with the Ilimit_latch signal while performing an inductive sense routine.

FIG. 5 shows the BLDC motor coil current profile while performing the inductive sense routine. A dummy pulse is performed prior to the six inductive sense pulses to equalize the effect of the power supply on the subsequent measurements. The inductive sense pulse width is represented by the duration in which the Ilimit_latch signal stays high and is the time required for the current through respective stator winding pairs to reach the threshold value. On a BLDC motor, the alignment of the rotor can be determined by identifying the shortest pulse. In FIG. 5 this is CB and AB, so we can conclude the rotor is aligned at the intersection between CB and AB.

Figure 6:
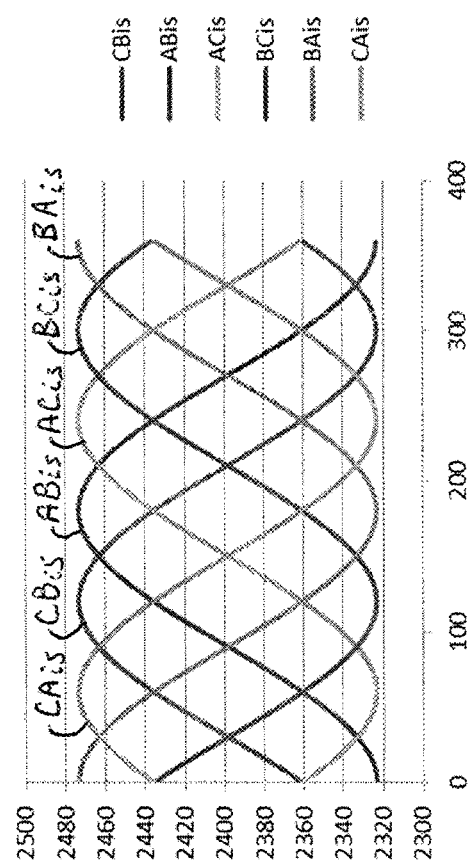
FIG. 6 is a graph of inductive sense count as a function of rotor position for each of six inductive sense pulses.

FIG. 6 is a graph of inductive sense period as a function of rotor position for each of six inductive sense pulses BAis, CAis, CBis, ABis, ACis, and BCis. The actual values of the inductive sense period are less important than the relationships between the inductive sense pulses as a function of rotor position, as can be seen from FIG. 6.

Figure 7:
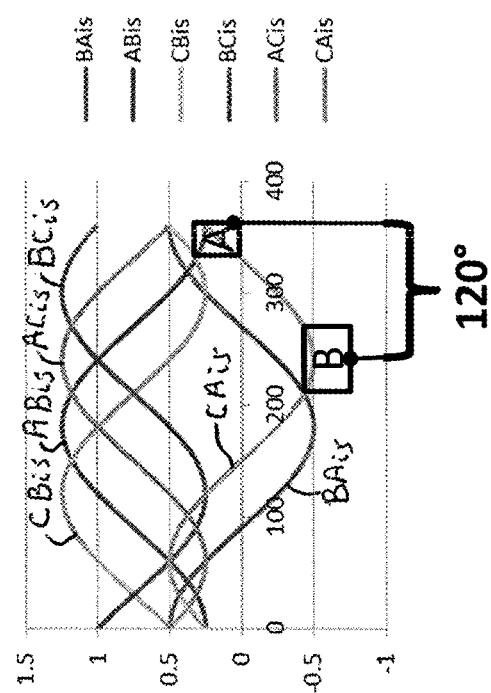
FIG. 7 is a graph of inductive sense period as a function of rotor position for each of six inductive sense pulses if a mismatch of 0.75 times the inductive sense variation is introduced.

To simplify calculations, we can represent manufacturing defects that cause mismatches between the three phases by a shift in the Ilimit measurement. If the shift between motor phases is as much as 0.75× of the amplitude of the inductive sense counts variation, the worst case distortion of inductive sense counts is as shown in FIG. 7. It is clear that we would not be able to identify the rotor position accurately. In this case, the worst case error in position detection is 120°, as region A would be mis-detected as region B.

Figure 8:
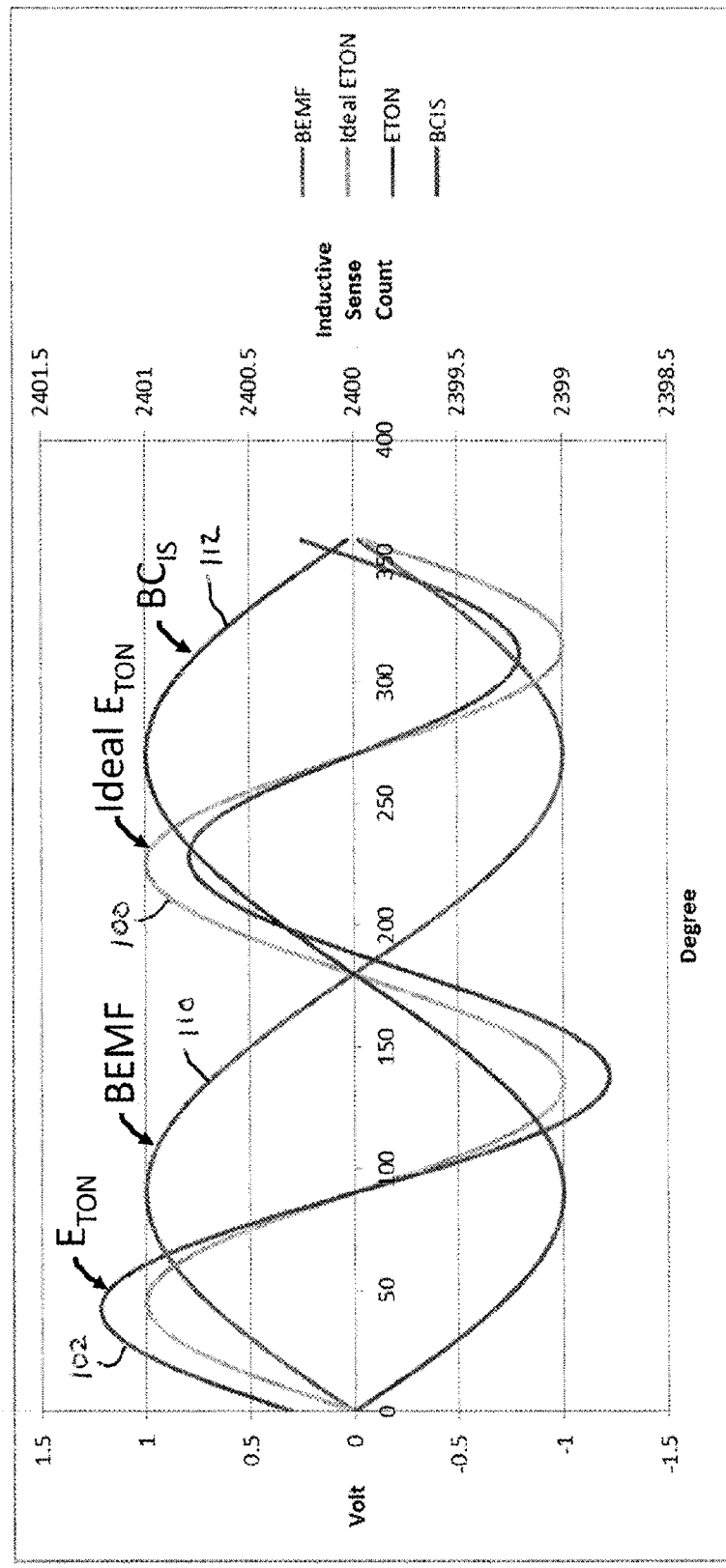
FIG. 8 is a timing diagram that illustrates the phase relationship between the ETON waveform, BEMF and inductive sense count as a function of rotor position.

FIG. 8 illustrates the relationship between various waveforms as a function of rotor position for the case where inductive sense of the BC pulse is performed. Waveform 100 is the ideal ETON amplitude and as shown has two cycles for one electrical cycle. Waveform 102 represents the actual ETON amplitude, taking into account the saturation effect. The higher the current in the motor windings, the higher the saturation effect, and the larger the deviation from the ideal ETON waveform. Waveform 110 represents the back EMF magnitude as a function of rotor position, and waveform 112 represents an inductive sense pulse BCis amplitude as a function of rotor position with its y-axis value on the right side.

From FIG. 8 it is clear that we can avoid the saturation effect on the ETON waveform by using the information at the time when the inductive sense count is lower than its mean (e.g. between 0° to 180° in FIG. 8). But when the inductive sense count is higher than its mean value, sampling the ETON waveform is unreliable, as it is subjected to the saturation effect.

Figure 9:
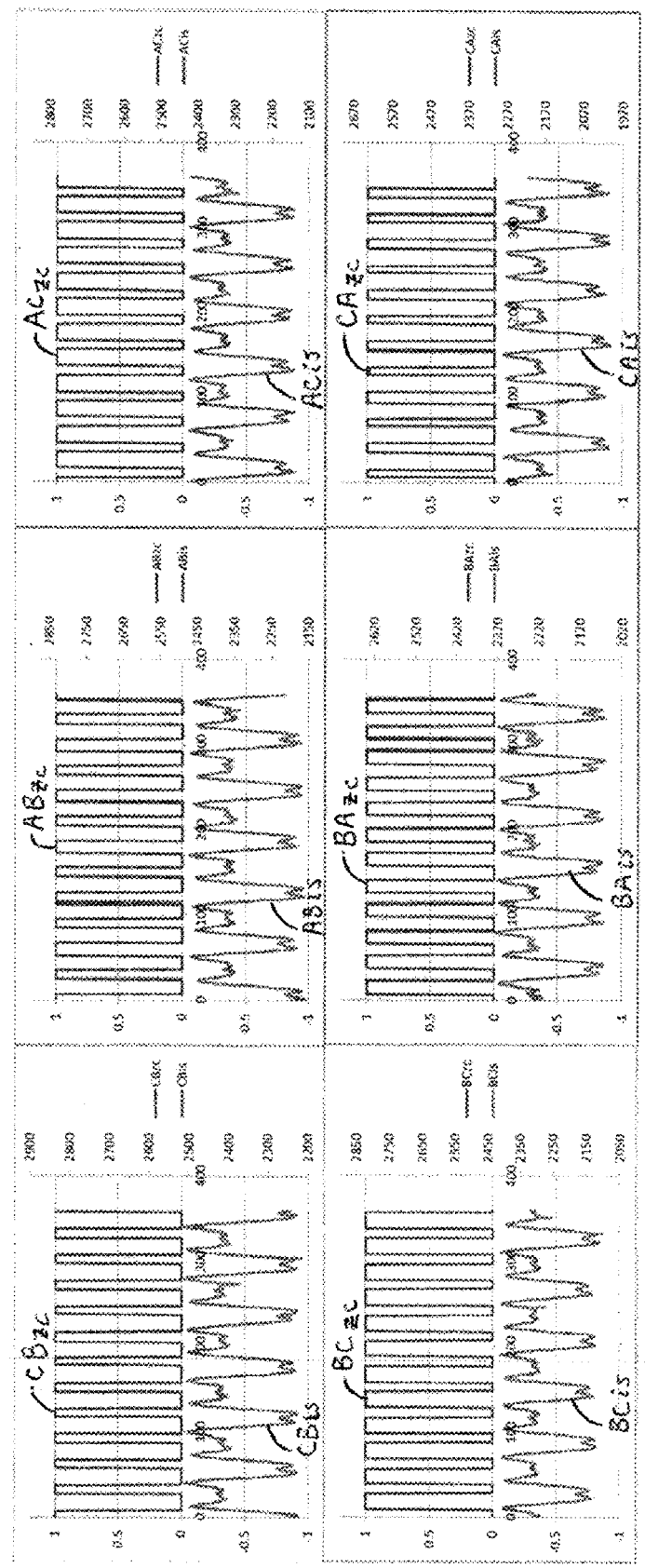
FIG. 9 shows the various digitized ETON waveforms, taken while the motor winding currents are low, and the corresponding inductive sense counts.
Figure 10:
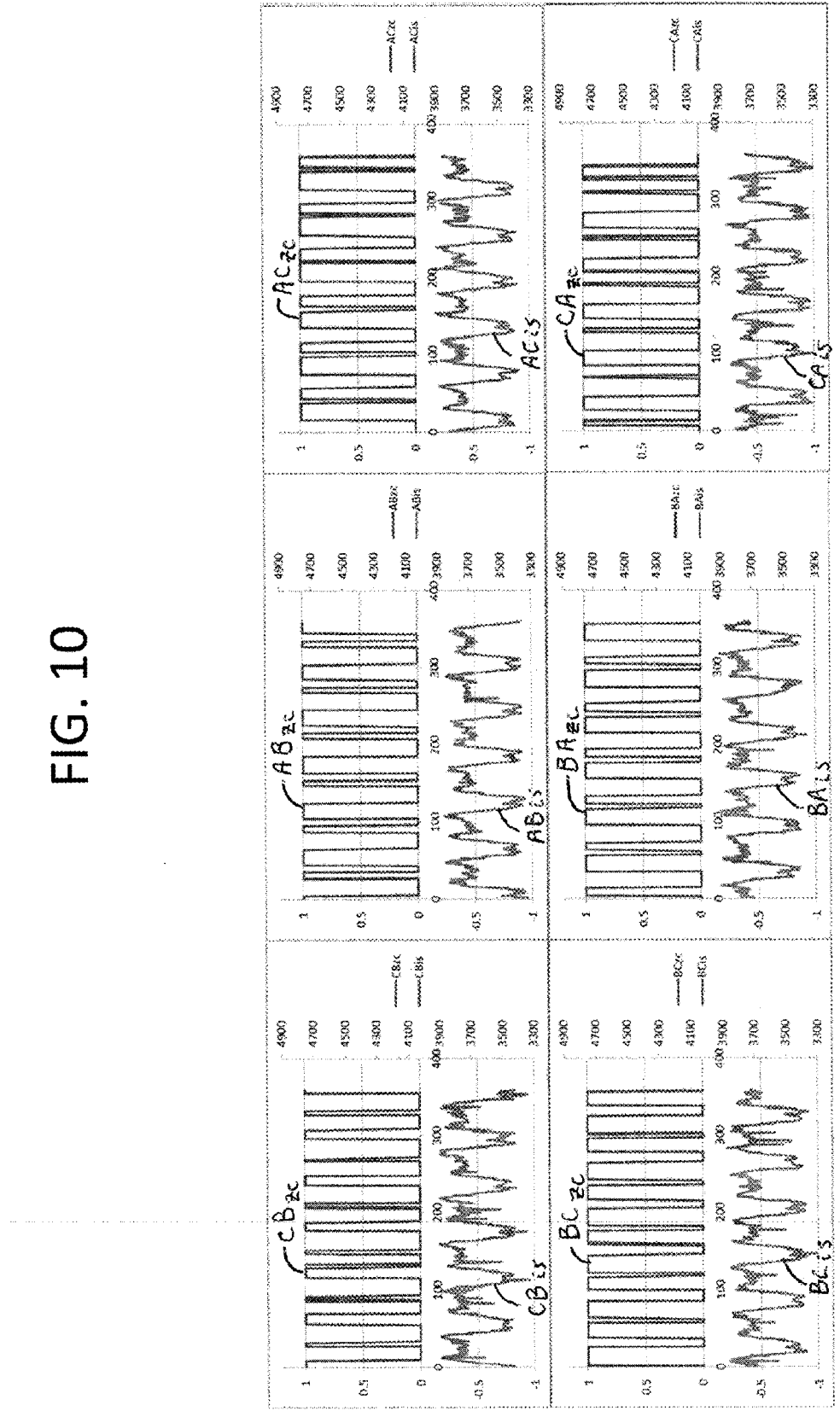
FIG. 10 shows the various digitized ETON waveforms, taken while the motor winding currents are high, and the corresponding inductive sense counts.

FIG. 9 shows the various ETON waveforms, digitized by comparator 42, while the cores are driven close to linear to minimize the saturation effect, and the corresponding inductive sense pulses using the measurement setup as illustrated in FIG. 3. FIG. 10 shows the various ETON waveforms, digitized by comparator 42, slightly before the winding current reaches the current limit, and the corresponding inductive sense pulses using the measurement setup as illustrated in FIG. 4. Both FIGS. 9 and 10 show measurements taken from an actual BLDC motor.

It is clear that the digitized ETON waveform in FIG. 9 more resembles a square wave than the one shown in FIG. 10. It is therefore important to choose a time Δt that is appropriate to minimize this saturation effect. The deviation from square wave mainly occurs when the inductive sense pulse is high, but as concluded previously, the saturation effect is nonexistent when the corresponding inductive sense pulse is low.

Figure 11:
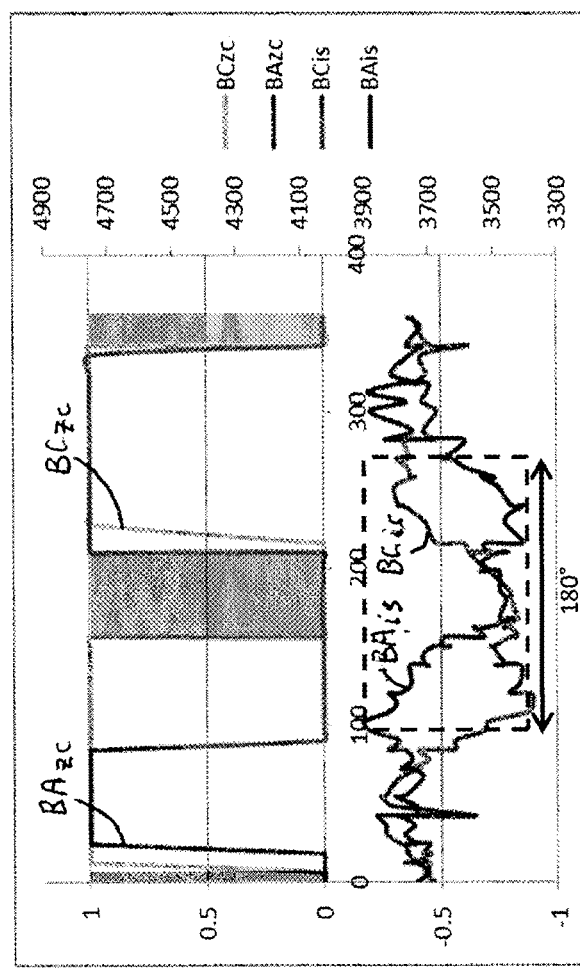
FIG. 11 shows the relationship between two adjacent inductive sense counts, namely BCis and BAis, together with the corresponding digitized ETON waveforms BCzc and BAzc.

FIG. 11 shows two adjacent inductive sense counts, namely BCis and BAis, together with their digitized ETON waveforms BCzc and BAzc. The shaded box covers the region where both BCzc and BAzc are low, whereas the dotted box covers the 180° region centered on the mid-point where both BCis and BAis are low. The region where the dotted box intersects the shaded box, which covers the middle 60° region of the dotted box, is a region where both BAis and BCis are low, and therefore, the ETON waveforms are not affected by the saturation effect. The above argument can be extended to all six adjacent pairs of inductive sense pulses.

Figure 12:
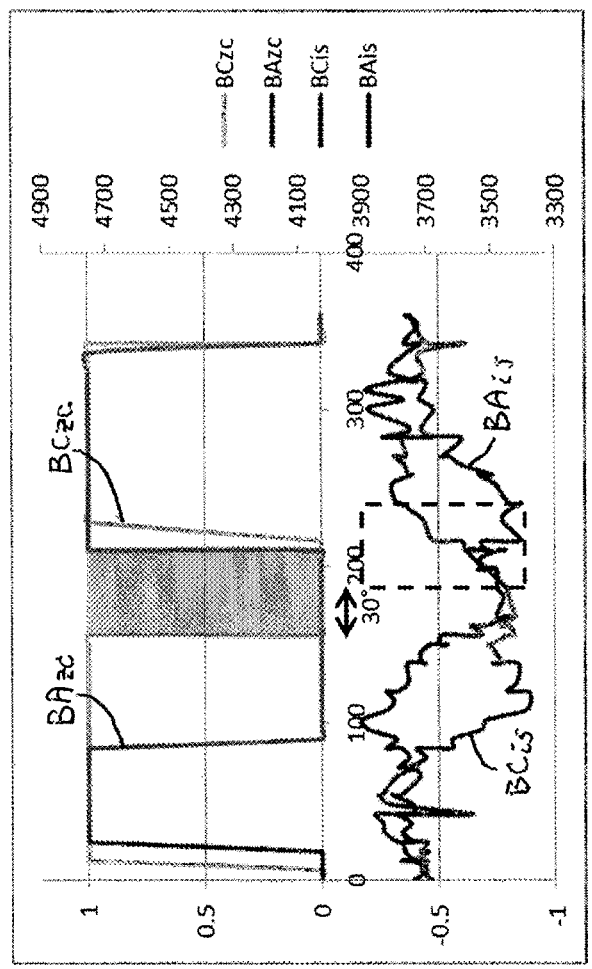
FIG. 12 shows the phase difference between the inductive sense region and the mutual inductance region.

Referring to FIG. 12, the shaded box again represents the region as defined by ETON waveforms BCzc and BAzc, whereas the dotted box represents the region defined by the normal inductive sense when BAis is the shortest pulse. This shows that the mutual inductance region is 30° misaligned with the normal inductive sense region.

This disclosure supplements the known inductive sense routine with information on the ETON waveforms to achieve better rotor position detection accuracy. All we need to do is use the known inductive sense count information to determine this 180° dotted box region, and then use the mutual inductance information to zero in further to the 60° region. Since we do not need to use the inductive sense information to gain 60° resolution, we are able to tolerate much higher mismatches between phases.

Six 180° regions are defined by regions A>0, B>0, C>0, A<0, B<0 and C<0 where regions A, B and C are defined as follows:

$$A = BAis - ABis - CBis + BCis \quad (1)$$

$$B = CBis - BCis - ACis + CAis \quad (2)$$

$$C = ACis - CAis - BAis + ABis \quad (3)$$

Figure 13:
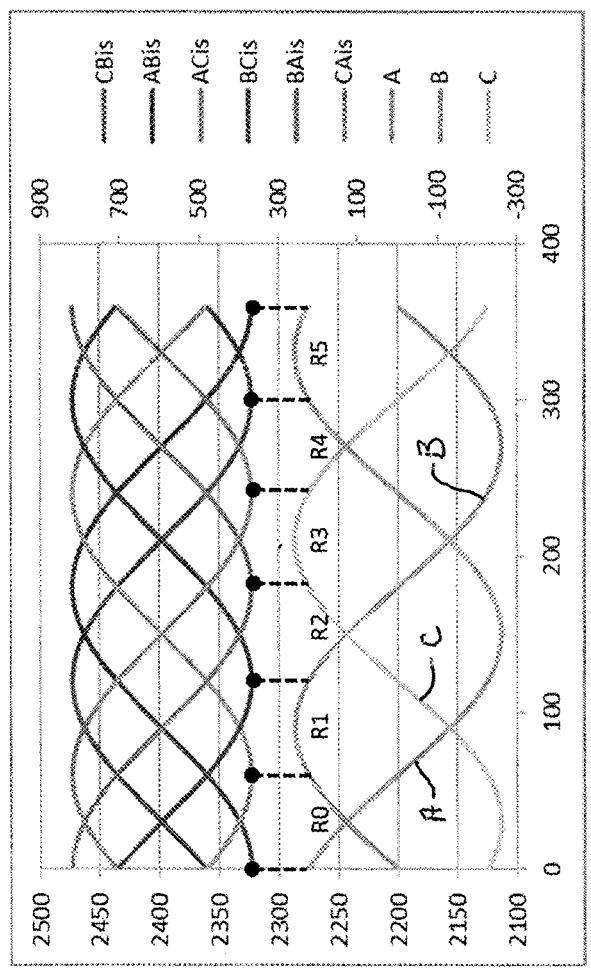
FIG. 13 shows the phase relationship between the constructed A, B and C regions and the six inductive sense counts as a function of rotor position, and six mutual inductance regions are defined.

FIG. 13 shows the relation between the A, B and C regions, and the six inductive sense counts as well as the six mutual inductance regions.

Based on the A, B and C regions and the six digitized ETON waveforms, we can then build a truth table that is used to determine the rotor position. Such a table is shown in Table 1. In Table 1, A>0, B>0 and C>0 are represented as A=1, B=1 and C=1, and, A≤0, B≤0 and C≤0 are represented as A=0, B=0 and C=0. As can be seen in Table 1, the maximum position detection error is only 30° if the saturation effect is avoided by sampling the six ETON waveforms while the motor coil current is still low and if the manufacturing defects are confined to 0.75 times the normal inductive sense variation. In the unlikely event that the saturation effect is not avoided, the maximum error becomes 90° which stills compares favorably to the old inductive sense routine (120°). Due to the nature of a BLDC motor, Table 1 covers only 264 out of the total 512 possible states for a nine input truth table. A BLDC motor simply would not yield an input not defined by Table 1. Table 1 is attached hereto as an appendix and is hereby incorporated by reference in its entirety.

Figure 14:
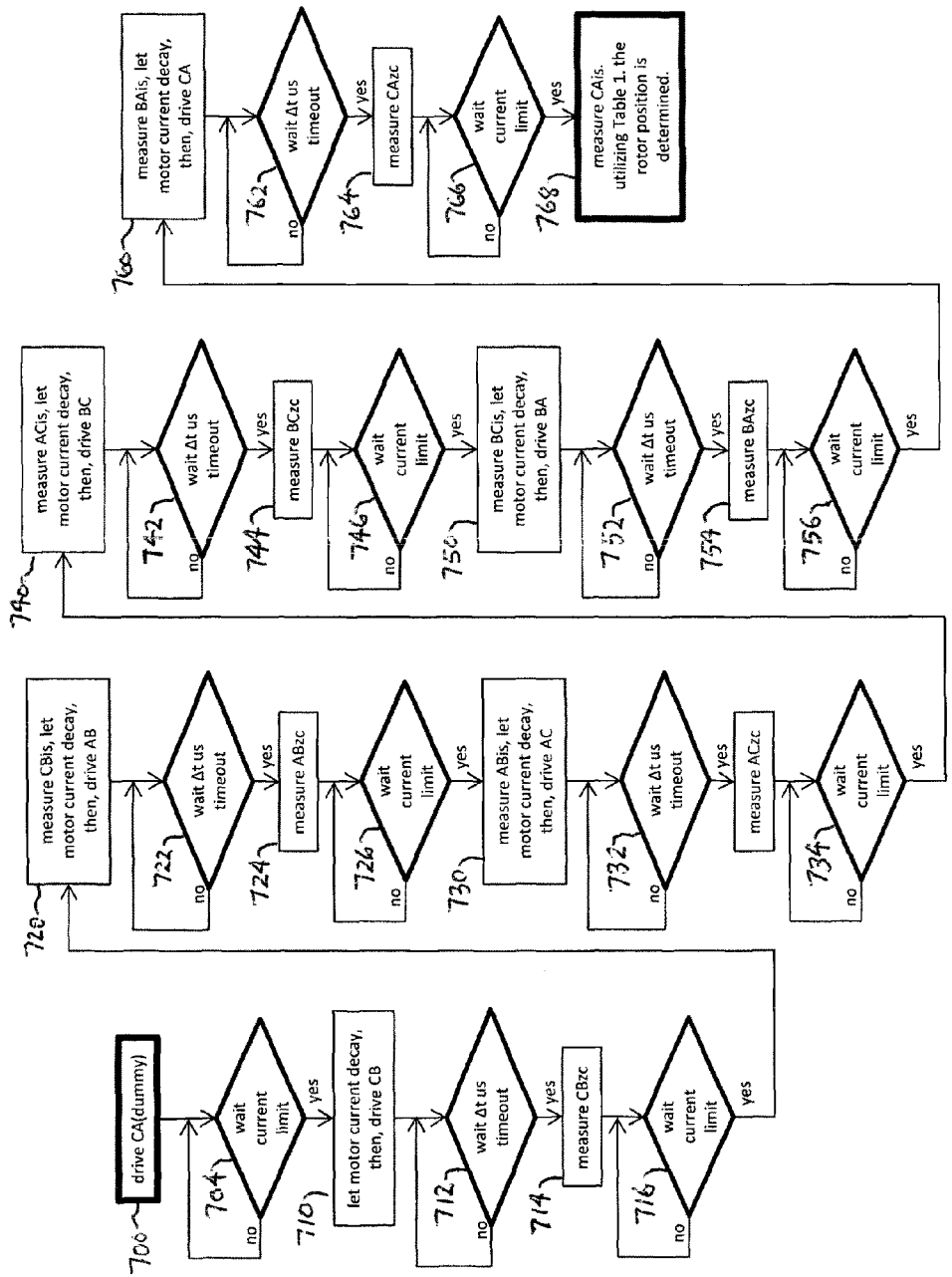
FIG. 14 is flowchart for performing the enhanced inductive sense process.

FIG. 14 illustrates one possible flowchart to perform the enhanced inductive sense process as described in this disclosure. It will be understood that the enhanced inductive sense routine may include additional acts and that one or more of the acts shown in FIG. 14 may be omitted, according to embodiments.

To avoid the saturation effect and improve accuracy, the process of FIG. 14 is performed using the motor system shown in FIG. 3. However, since the saturation effect is dependent on individual motors, it is not a valid assumption that the saturation effect could be eliminated completely and Table 1 is built considering the saturation effect. The process of FIG. 14 may be performed by the state machine/sequencer 32, which may include a processing device and a computer-readable storage device encoded with instructions that, when executed by the processing device, perform the process. During execution of the process, the state machine/sequencer 32 controls the circuitry shown in FIG. 3 to perform the acts of the process. In other embodiments, the process of FIG. 14 may be performed by a computing device separate from state machine/sequencer 32.

In act 700, winding pair CA is driven as a dummy cycle. In act 704, the process waits until the current limit Ilimit is reached. Since this is a dummy cycle, no measurement is taken.

In act 710, winding pair CB is driven. The process waits Δt microseconds in act 712 and measures ETON waveform CBzc in act 714. The process then waits until the current limit Ilimit is reached in act 716 and measures the inductive sense count CBis in act 720. Act 720 also includes letting the motor current decay, and then driving winding pair AB.

The process is repeated for winding pair AB. In particular, process waits Δt microseconds in act 722 and measures ETON waveform ABzc in act 724. The process then waits until the current limit Ilimit is reached in act 726 and measures the inductive sense count ABis in act 730. Act 730 also includes letting the motor current decay and then driving winding pair AC.

In a similar manner, ETON waveform ACzc and inductive sense count ACis are measured in acts 732, 734, 736 and 740. Likewise, ETON waveform BCzc and inductive sense count BCis are measured in acts 742, 744, 746 and 750; ETON waveform BAzc and inductive sense count BAis are measured in acts 752, 754, 756 and 760; and ETON waveform CAzc and inductive sense count CAis are measured in acts 762, 764, 766, and 768.

In act 768, the ETON waveform values and the inductive sense count values are used to reference an entry in Table 1 which provides the position of the rotor. In particular, the values of the six digitized ETON waveforms are listed in the table, and the values of regions A, B and C are determined according to equations (1), (2), and (3) as described above. The value in the table matching the values of regions A, B and C and the six digitized ETON waveform values is identified as the position of the rotor.

Although not the main objective of this disclosure, since the mutual inductance and inductive sense information have a phase misalignment of 30°, we could also use both information to double the position sensing resolution at the expense of having less accurate information due to lower tolerance to manufacturing defects.

Having thus described at least one illustrative embodiment of the invention, various alterations, modifications and improvements will readily occur to those skilled in the art. Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

TABLE 1

| A | B | C | CBzc | ABzc | ACzc | BCzc | BAzc | CAzc | Possible Region | Detected Region | Max. Detection Error |
|---|---|---|------|------|------|------|------|------|-----------------|-----------------|----------------------|
| 0 | 1 | 0 | 0 | 0 | 0 | 0 | 1 | 0 | R0 | R0 = AC | 30° |
| 0 | 1 | 0 | 0 | 0 | 0 | 0 | 1 | 1 | R0 | R0 = AC | 30° |
| 0 | 1 | 0 | 0 | 0 | 0 | 1 | 0 | 0 | R0 | R0 = AC | 30° |
| 0 | 1 | 0 | 0 | 0 | 0 | 1 | 0 | 1 | R0 | R0 = AC | 30° |
| 0 | 1 | 0 | 0 | 0 | 0 | 1 | 1 | 0 | R0 | R0 = AC | 30° |
| 0 | 1 | 0 | 0 | 0 | 0 | 1 | 1 | 1 | R0 | R0 = AC | 30° |
| 0 | 1 | 0 | 1 | 0 | 0 | 0 | 1 | 0 | R0 | R0 = AC | 30° |
| 0 | 1 | 0 | 1 | 0 | 0 | 0 | 1 | 1 | R0 | R0 = AC | 30° |
| 0 | 1 | 0 | 1 | 0 | 0 | 1 | 0 | 0 | R0 | R0 = AC | 30° |
| 0 | 1 | 0 | 1 | 0 | 0 | 1 | 0 | 1 | R0 | R0 = AC | 30° |
| 0 | 1 | 0 | 1 | 0 | 0 | 1 | 1 | 0 | R0 | R0 = AC | 30° |
| 0 | 1 | 0 | 1 | 0 | 0 | 1 | 1 | 1 | R0 | R0 = AC | 30° |
| 1 | 0 | 0 | 0 | 0 | 0 | 0 | 0 | 1 | R0 | R0 = AC | 30° |

TABLE 1-continued

| A | B | C | CBzc | ABzc | ACzc | BCzc | BAzc | CAzc | Possible Region | Detected Region | Max. Detection Error |
|---|---|---|------|------|------|------|------|------|-----------------|-----------------|----------------------|
| 1 | 0 | 0 | 0 | 0 | 0 | 0 | 1 | 1 | R0 | R0 = AC | 30° |
| 1 | 0 | 0 | 0 | 0 | 0 | 1 | 0 | 1 | R0 | R0 = AC | 30° |
| 1 | 0 | 0 | 0 | 0 | 0 | 1 | 1 | 1 | R0 | R0 = AC | 30° |
| 1 | 0 | 0 | 1 | 0 | 0 | 0 | 0 | 0 | R0 | R0 = AC | 30° |
| 1 | 0 | 0 | 1 | 0 | 0 | 0 | 0 | 1 | R0 | R0 = AC | 30° |
| 1 | 0 | 0 | 1 | 0 | 0 | 0 | 1 | 0 | R0 | R0 = AC | 30° |
| 1 | 0 | 0 | 1 | 0 | 0 | 0 | 1 | 1 | R0 | R0 = AC | 30° |
| 1 | 0 | 0 | 1 | 0 | 0 | 1 | 0 | 0 | R0 | R0 = AC | 30° |
| 1 | 0 | 0 | 1 | 0 | 0 | 1 | 0 | 1 | R0 | R0 = AC | 30° |
| 1 | 0 | 0 | 1 | 0 | 0 | 1 | 1 | 0 | R0 | R0 = AC | 30° |
| 1 | 0 | 0 | 1 | 0 | 0 | 1 | 1 | 1 | R0 | R0 = AC | 30° |
| 1 | 1 | 0 | 0 | 0 | 0 | 0 | 0 | 0 | R0 | R0 = AC | 30° |
| 1 | 1 | 0 | 0 | 0 | 0 | 0 | 0 | 1 | R0 | R0 = AC | 30° |
| 1 | 1 | 0 | 0 | 0 | 0 | 0 | 1 | 0 | R0 | R0 = AC | 30° |
| 1 | 1 | 0 | 0 | 0 | 0 | 0 | 1 | 1 | R0 | R0 = AC | 30° |
| 1 | 1 | 0 | 0 | 0 | 0 | 1 | 0 | 0 | R0 | R0 = AC | 30° |
| 1 | 1 | 0 | 0 | 0 | 0 | 1 | 0 | 1 | R0 | R0 = AC | 30° |
| 1 | 1 | 0 | 0 | 0 | 0 | 1 | 1 | 0 | R0 | R0 = AC | 30° |
| 1 | 1 | 0 | 0 | 0 | 0 | 1 | 1 | 1 | R0 | R0 = AC | 30° |
| 1 | 1 | 0 | 1 | 0 | 0 | 0 | 0 | 0 | R0 | R0 = AC | 30° |
| 1 | 1 | 0 | 1 | 0 | 0 | 0 | 0 | 1 | R0 | R0 = AC | 30° |
| 1 | 1 | 0 | 1 | 0 | 0 | 0 | 1 | 0 | R0 | R0 = AC | 30° |
| 1 | 1 | 0 | 1 | 0 | 0 | 0 | 1 | 1 | R0 | R0 = AC | 30° |
| 1 | 1 | 0 | 1 | 0 | 0 | 1 | 0 | 0 | R0 | R0 = AC | 30° |
| 1 | 1 | 0 | 1 | 0 | 0 | 1 | 0 | 1 | R0 | R0 = AC | 30° |
| 1 | 1 | 0 | 1 | 0 | 0 | 1 | 1 | 0 | R0 | R0 = AC | 30° |
| 1 | 1 | 0 | 1 | 0 | 0 | 1 | 1 | 1 | R0 | R0 = AC | 30° |
| 0 | 1 | 0 | 0 | 0 | 1 | 1 | 0 | 0 | R1 | R1 = BC | 30° |
| 0 | 1 | 0 | 0 | 0 | 1 | 1 | 0 | 1 | R1 | R1 = BC | 30° |
| 0 | 1 | 0 | 0 | 0 | 1 | 1 | 1 | 0 | R1 | R1 = BC | 30° |
| 0 | 1 | 0 | 0 | 0 | 1 | 1 | 1 | 1 | R1 | R1 = BC | 30° |
| 0 | 1 | 0 | 0 | 1 | 1 | 1 | 0 | 0 | R1 | R1 = BC | 30° |
| 0 | 1 | 0 | 0 | 1 | 1 | 1 | 0 | 1 | R1 | R1 = BC | 30° |
| 0 | 1 | 0 | 0 | 1 | 1 | 1 | 1 | 0 | R1 | R1 = BC | 30° |
| 0 | 1 | 0 | 0 | 1 | 1 | 1 | 1 | 1 | R1 | R1 = BC | 30° |
| 0 | 1 | 0 | 1 | 0 | 1 | 1 | 0 | 0 | R1 | R1 = BC | 30° |
| 0 | 1 | 0 | 1 | 0 | 1 | 1 | 0 | 1 | R1 | R1 = BC | 30° |
| 0 | 1 | 0 | 1 | 0 | 1 | 1 | 1 | 0 | R1 | R1 = BC | 30° |
| 0 | 1 | 0 | 1 | 0 | 1 | 1 | 1 | 1 | R1 | R1 = BC | 30° |
| 0 | 1 | 0 | 1 | 1 | 1 | 1 | 0 | 0 | R1 | R1 = BC | 30° |
| 0 | 1 | 0 | 1 | 1 | 1 | 1 | 0 | 1 | R1 | R1 = BC | 30° |
| 0 | 1 | 0 | 1 | 1 | 1 | 1 | 1 | 0 | R1 | R1 = BC | 30° |
| 0 | 1 | 0 | 1 | 1 | 1 | 1 | 1 | 1 | R1 | R1 = BC | 30° |
| 0 | 1 | 1 | 0 | 0 | 1 | 1 | 0 | 0 | R1 | R1 = BC | 30° |
| 0 | 1 | 1 | 0 | 0 | 1 | 1 | 0 | 1 | R1 | R1 = BC | 30° |
| 0 | 1 | 1 | 0 | 0 | 1 | 1 | 1 | 0 | R1 | R1 = BC | 30° |
| 0 | 1 | 1 | 0 | 1 | 1 | 1 | 0 | 0 | R1 | R1 = BC | 30° |
| 0 | 1 | 1 | 0 | 1 | 1 | 1 | 0 | 1 | R1 | R1 = BC | 30° |
| 0 | 1 | 1 | 0 | 1 | 1 | 1 | 1 | 0 | R1 | R1 = BC | 30° |
| 0 | 1 | 1 | 1 | 0 | 1 | 1 | 0 | 0 | R1 | R1 = BC | 30° |
| 0 | 1 | 1 | 1 | 0 | 1 | 1 | 0 | 1 | R1 | R1 = BC | 30° |
| 0 | 1 | 1 | 1 | 0 | 1 | 1 | 1 | 0 | R1 | R1 = BC | 30° |
| 0 | 1 | 1 | 1 | 1 | 1 | 1 | 0 | 0 | R1 | R1 = BC | 30° |
| 0 | 1 | 1 | 1 | 1 | 1 | 1 | 0 | 1 | R1 | R1 = BC | 30° |
| 1 | 1 | 0 | 0 | 0 | 1 | 1 | 0 | 0 | R1 | R1 = BC | 30° |
| 1 | 1 | 0 | 0 | 0 | 1 | 1 | 0 | 1 | R1 | R1 = BC | 30° |
| 1 | 1 | 0 | 0 | 0 | 1 | 1 | 1 | 0 | R1 | R1 = BC | 30° |
| 1 | 1 | 0 | 0 | 0 | 1 | 1 | 1 | 1 | R1 | R1 = BC | 30° |
| 1 | 1 | 0 | 0 | 1 | 1 | 1 | 0 | 0 | R1 | R1 = BC | 30° |
| 1 | 1 | 0 | 0 | 1 | 1 | 1 | 0 | 1 | R1 | R1 = BC | 30° |
| 1 | 1 | 0 | 0 | 1 | 1 | 1 | 1 | 0 | R1 | R1 = BC | 30° |
| 1 | 1 | 0 | 0 | 1 | 1 | 1 | 1 | 1 | R1 | R1 = BC | 30° |
| 1 | 1 | 0 | 1 | 0 | 1 | 1 | 0 | 0 | R1 | R1 = BC | 30° |
| 1 | 1 | 0 | 1 | 0 | 1 | 1 | 0 | 1 | R1 | R1 = BC | 30° |
| 1 | 1 | 0 | 1 | 0 | 1 | 1 | 1 | 0 | R1 | R1 = BC | 30° |
| 1 | 1 | 0 | 1 | 0 | 1 | 1 | 1 | 1 | R1 | R1 = BC | 30° |
| 0 | 0 | 1 | 0 | 0 | 0 | 0 | 0 | 1 | R2 | R2 = BA | 30° |
| 0 | 0 | 1 | 0 | 0 | 1 | 0 | 0 | 1 | R2 | R2 = BA | 30° |
| 0 | 0 | 1 | 0 | 1 | 0 | 0 | 0 | 1 | R2 | R2 = BA | 30° |
| 0 | 0 | 1 | 0 | 1 | 1 | 0 | 0 | 1 | R2 | R2 = BA | 30° |
| 0 | 0 | 1 | 1 | 0 | 0 | 0 | 0 | 0 | R2 | R2 = BA | 30° |
| 0 | 0 | 1 | 1 | 0 | 0 | 0 | 0 | 1 | R2 | R2 = BA | 30° |
| 0 | 0 | 1 | 1 | 0 | 1 | 0 | 0 | 0 | R2 | R2 = BA | 30° |
| 0 | 0 | 1 | 1 | 0 | 1 | 0 | 0 | 1 | R2 | R2 = BA | 30° |
| 0 | 0 | 1 | 1 | 1 | 0 | 0 | 0 | 0 | R2 | R2 = BA | 30° |

TABLE 1-continued

| A | B | C | CBzc | ABzc | ACzc | BCzc | BAzc | CAzc | Possible Region | Detected Region | Max. Detection Error |
|---|---|---|------|------|------|------|------|------|-----------------|-----------------|----------------------|
| 0 | 0 | 1 | 1 | 1 | 0 | 0 | 0 | 1 | R2 | R2 = BA | 30° |
| 0 | 0 | 1 | 1 | 1 | 1 | 0 | 0 | 0 | R2 | R2 = BA | 30° |
| 0 | 0 | 1 | 1 | 1 | 1 | 0 | 0 | 1 | R2 | R2 = BA | 30° |
| 0 | 1 | 0 | 0 | 0 | 1 | 0 | 0 | 0 | R2 | R2 = BA | 30° |
| 0 | 1 | 0 | 0 | 0 | 1 | 0 | 0 | 1 | R2 | R2 = BA | 30° |
| 0 | 1 | 0 | 0 | 1 | 0 | 0 | 0 | 0 | R2 | R2 = BA | 30° |
| 0 | 1 | 0 | 0 | 1 | 0 | 0 | 0 | 1 | R2 | R2 = BA | 30° |
| 0 | 1 | 0 | 0 | 1 | 1 | 0 | 0 | 0 | R2 | R2 = BA | 30° |
| 0 | 1 | 0 | 0 | 1 | 1 | 0 | 0 | 1 | R2 | R2 = BA | 30° |
| 0 | 1 | 0 | 1 | 0 | 1 | 0 | 0 | 0 | R2 | R2 = BA | 30° |
| 0 | 1 | 0 | 1 | 0 | 1 | 0 | 0 | 1 | R2 | R2 = BA | 30° |
| 0 | 1 | 0 | 1 | 1 | 0 | 0 | 0 | 0 | R2 | R2 = BA | 30° |
| 0 | 1 | 0 | 1 | 1 | 0 | 0 | 0 | 1 | R2 | R2 = BA | 30° |
| 0 | 1 | 0 | 1 | 1 | 1 | 0 | 0 | 0 | R2 | R2 = BA | 30° |
| 0 | 1 | 0 | 1 | 1 | 1 | 0 | 0 | 1 | R2 | R2 = BA | 30° |
| 0 | 1 | 1 | 0 | 0 | 0 | 0 | 0 | 0 | R2 | R2 = BA | 30° |
| 0 | 1 | 1 | 0 | 0 | 0 | 0 | 0 | 1 | R2 | R2 = BA | 30° |
| 0 | 1 | 1 | 0 | 0 | 1 | 0 | 0 | 0 | R2 | R2 = BA | 30° |
| 0 | 1 | 1 | 0 | 0 | 1 | 0 | 0 | 1 | R2 | R2 = BA | 30° |
| 0 | 1 | 1 | 0 | 1 | 0 | 0 | 0 | 0 | R2 | R2 = BA | 30° |
| 0 | 1 | 1 | 0 | 1 | 0 | 0 | 0 | 1 | R2 | R2 = BA | 30° |
| 0 | 1 | 1 | 0 | 1 | 1 | 0 | 0 | 0 | R2 | R2 = BA | 30° |
| 0 | 1 | 1 | 0 | 1 | 1 | 0 | 0 | 1 | R2 | R2 = BA | 30° |
| 0 | 1 | 1 | 1 | 0 | 0 | 0 | 0 | 0 | R2 | R2 = BA | 30° |
| 0 | 1 | 1 | 1 | 0 | 0 | 0 | 0 | 1 | R2 | R2 = BA | 30° |
| 0 | 1 | 1 | 1 | 0 | 1 | 0 | 0 | 0 | R2 | R2 = BA | 30° |
| 0 | 1 | 1 | 1 | 0 | 1 | 0 | 0 | 1 | R2 | R2 = BA | 30° |
| 0 | 1 | 1 | 1 | 1 | 0 | 0 | 0 | 0 | R2 | R2 = BA | 30° |
| 0 | 1 | 1 | 1 | 1 | 0 | 0 | 0 | 1 | R2 | R2 = BA | 30° |
| 0 | 1 | 1 | 1 | 1 | 1 | 0 | 0 | 0 | R2 | R2 = BA | 30° |
| 0 | 1 | 1 | 1 | 1 | 1 | 0 | 0 | 1 | R2 | R2 = BA | 30° |
| 0 | 0 | 1 | 0 | 0 | 0 | 0 | 1 | 1 | R3 | R3 = CA | 30° |
| 0 | 0 | 1 | 0 | 0 | 0 | 1 | 1 | 1 | R3 | R3 = CA | 30° |
| 0 | 0 | 1 | 0 | 0 | 1 | 0 | 1 | 1 | R3 | R3 = CA | 30° |
| 0 | 0 | 1 | 0 | 0 | 1 | 1 | 1 | 1 | R3 | R3 = CA | 30° |
| 0 | 0 | 1 | 0 | 1 | 0 | 0 | 1 | 1 | R3 | R3 = CA | 30° |
| 0 | 0 | 1 | 0 | 1 | 0 | 1 | 1 | 1 | R3 | R3 = CA | 30° |
| 0 | 0 | 1 | 0 | 1 | 1 | 0 | 1 | 1 | R3 | R3 = CA | 30° |
| 0 | 0 | 1 | 0 | 1 | 1 | 1 | 1 | 1 | R3 | R3 = CA | 30° |
| 0 | 0 | 1 | 1 | 0 | 0 | 0 | 1 | 1 | R3 | R3 = CA | 30° |
| 0 | 0 | 1 | 1 | 0 | 0 | 1 | 1 | 1 | R3 | R3 = CA | 30° |
| 0 | 0 | 1 | 1 | 0 | 1 | 0 | 1 | 1 | R3 | R3 = CA | 30° |
| 0 | 0 | 1 | 1 | 0 | 1 | 1 | 1 | 1 | R3 | R3 = CA | 30° |
| 0 | 0 | 1 | 1 | 1 | 0 | 0 | 1 | 1 | R3 | R3 = CA | 30° |
| 0 | 0 | 1 | 1 | 1 | 0 | 1 | 1 | 1 | R3 | R3 = CA | 30° |
| 0 | 0 | 1 | 1 | 1 | 1 | 0 | 1 | 1 | R3 | R3 = CA | 30° |
| 0 | 0 | 1 | 1 | 1 | 1 | 1 | 1 | 1 | R3 | R3 = CA | 30° |
| 0 | 1 | 1 | 0 | 0 | 0 | 0 | 1 | 1 | R3 | R3 = CA | 30° |
| 0 | 1 | 1 | 0 | 0 | 0 | 1 | 1 | 1 | R3 | R3 = CA | 30° |
| 0 | 1 | 1 | 0 | 0 | 1 | 0 | 1 | 1 | R3 | R3 = CA | 30° |
| 0 | 1 | 1 | 0 | 1 | 0 | 0 | 1 | 1 | R3 | R3 = CA | 30° |
| 0 | 1 | 1 | 0 | 1 | 0 | 1 | 1 | 1 | R3 | R3 = CA | 30° |
| 0 | 1 | 1 | 0 | 1 | 1 | 0 | 1 | 1 | R3 | R3 = CA | 30° |
| 0 | 1 | 1 | 1 | 0 | 0 | 0 | 1 | 1 | R3 | R3 = CA | 30° |
| 0 | 1 | 1 | 1 | 0 | 0 | 1 | 1 | 1 | R3 | R3 = CA | 30° |
| 0 | 1 | 1 | 1 | 0 | 1 | 0 | 1 | 1 | R3 | R3 = CA | 30° |
| 0 | 1 | 1 | 1 | 1 | 0 | 0 | 1 | 1 | R3 | R3 = CA | 30° |
| 0 | 1 | 1 | 1 | 1 | 0 | 1 | 1 | 1 | R3 | R3 = CA | 30° |
| 0 | 1 | 1 | 1 | 1 | 1 | 0 | 1 | 1 | R3 | R3 = CA | 30° |
| 1 | 0 | 1 | 0 | 0 | 0 | 0 | 1 | 1 | R3 | R3 = CA | 30° |
| 1 | 0 | 1 | 0 | 0 | 0 | 1 | 1 | 1 | R3 | R3 = CA | 30° |
| 1 | 0 | 1 | 0 | 0 | 1 | 0 | 1 | 1 | R3 | R3 = CA | 30° |
| 1 | 0 | 1 | 0 | 0 | 1 | 1 | 1 | 1 | R3 | R3 = CA | 30° |
| 1 | 0 | 1 | 0 | 1 | 0 | 0 | 1 | 1 | R3 | R3 = CA | 30° |
| 1 | 0 | 1 | 0 | 1 | 0 | 1 | 1 | 1 | R3 | R3 = CA | 30° |
| 1 | 0 | 1 | 0 | 1 | 1 | 0 | 1 | 1 | R3 | R3 = CA | 30° |
| 1 | 0 | 1 | 0 | 1 | 1 | 1 | 1 | 1 | R3 | R3 = CA | 30° |
| 1 | 0 | 1 | 1 | 0 | 0 | 0 | 1 | 1 | R3 | R3 = CA | 30° |
| 1 | 0 | 1 | 1 | 0 | 0 | 1 | 1 | 1 | R3 | R3 = CA | 30° |
| 1 | 0 | 1 | 1 | 0 | 1 | 0 | 1 | 1 | R3 | R3 = CA | 30° |
| 1 | 0 | 1 | 1 | 0 | 1 | 1 | 1 | 1 | R3 | R3 = CA | 30° |
| 0 | 0 | 1 | 0 | 0 | 0 | 0 | 1 | 0 | R4 | R4 = CB | 30° |
| 0 | 0 | 1 | 0 | 0 | 0 | 1 | 0 | 0 | R4 | R4 = CB | 30° |
| 0 | 0 | 1 | 0 | 0 | 0 | 1 | 1 | 0 | R4 | R4 = CB | 30° |
| 0 | 0 | 1 | 0 | 0 | 1 | 0 | 1 | 0 | R4 | R4 = CB | 30° |
| 0 | 0 | 1 | 0 | 0 | 1 | 1 | 0 | 0 | R4 | R4 = CB | 30° |

TABLE 1-continued

| A | B | C | CBzc | ABzc | ACzc | BCzc | BAzc | CAzc | Possible Region | Detected Region | Max. Detection Error |
|---|---|---|------|------|------|------|------|------|-----------------|-----------------|----------------------|
| 0 | 0 | 1 | 0 | 0 | 1 | 1 | 1 | 0 | R4 | R4 = CB | 30° |
| 0 | 0 | 1 | 0 | 1 | 0 | 0 | 1 | 0 | R4 | R4 = CB | 30° |
| 0 | 0 | 1 | 0 | 1 | 0 | 1 | 0 | 0 | R4 | R4 = CB | 30° |
| 0 | 0 | 1 | 0 | 1 | 0 | 1 | 1 | 0 | R4 | R4 = CB | 30° |
| 0 | 0 | 1 | 0 | 1 | 1 | 0 | 1 | 0 | R4 | R4 = CB | 30° |
| 0 | 0 | 1 | 0 | 1 | 1 | 1 | 0 | 0 | R4 | R4 = CB | 30° |
| 0 | 0 | 1 | 0 | 1 | 1 | 1 | 1 | 0 | R4 | R4 = CB | 30° |
| 1 | 0 | 0 | 0 | 0 | 1 | 0 | 0 | 0 | R4 | R4 = CB | 30° |
| 1 | 0 | 0 | 0 | 0 | 1 | 0 | 1 | 0 | R4 | R4 = CB | 30° |
| 1 | 0 | 0 | 0 | 0 | 1 | 1 | 0 | 0 | R4 | R4 = CB | 30° |
| 1 | 0 | 0 | 0 | 0 | 1 | 1 | 1 | 0 | R4 | R4 = CB | 30° |
| 1 | 0 | 0 | 0 | 1 | 0 | 0 | 0 | 0 | R4 | R4 = CB | 30° |
| 1 | 0 | 0 | 0 | 1 | 0 | 0 | 1 | 0 | R4 | R4 = CB | 30° |
| 1 | 0 | 0 | 0 | 1 | 0 | 1 | 0 | 0 | R4 | R4 = CB | 30° |
| 1 | 0 | 0 | 0 | 1 | 0 | 1 | 1 | 0 | R4 | R4 = CB | 30° |
| 1 | 0 | 0 | 0 | 1 | 1 | 0 | 0 | 0 | R4 | R4 = CB | 30° |
| 1 | 0 | 0 | 0 | 1 | 1 | 0 | 1 | 0 | R4 | R4 = CB | 30° |
| 1 | 0 | 0 | 0 | 1 | 1 | 1 | 0 | 0 | R4 | R4 = CB | 30° |
| 1 | 0 | 0 | 0 | 1 | 1 | 1 | 1 | 0 | R4 | R4 = CB | 30° |
| 1 | 0 | 1 | 0 | 0 | 0 | 0 | 0 | 0 | R4 | R4 = CB | 30° |
| 1 | 0 | 1 | 0 | 0 | 0 | 0 | 1 | 0 | R4 | R4 = CB | 30° |
| 1 | 0 | 1 | 0 | 0 | 0 | 1 | 0 | 0 | R4 | R4 = CB | 30° |
| 1 | 0 | 1 | 0 | 0 | 0 | 1 | 1 | 0 | R4 | R4 = CB | 30° |
| 1 | 0 | 1 | 0 | 0 | 1 | 0 | 0 | 0 | R4 | R4 = CB | 30° |
| 1 | 0 | 1 | 0 | 0 | 1 | 0 | 1 | 0 | R4 | R4 = CB | 30° |
| 1 | 0 | 1 | 0 | 0 | 1 | 1 | 0 | 0 | R4 | R4 = CB | 30° |
| 1 | 0 | 1 | 0 | 0 | 1 | 1 | 1 | 0 | R4 | R4 = CB | 30° |
| 1 | 0 | 1 | 0 | 1 | 0 | 0 | 0 | 0 | R4 | R4 = CB | 30° |
| 1 | 0 | 1 | 0 | 1 | 0 | 0 | 1 | 0 | R4 | R4 = CB | 30° |
| 1 | 0 | 1 | 0 | 1 | 0 | 1 | 0 | 0 | R4 | R4 = CB | 30° |
| 1 | 0 | 1 | 0 | 1 | 0 | 1 | 1 | 0 | R4 | R4 = CB | 30° |
| 1 | 0 | 1 | 0 | 1 | 1 | 0 | 0 | 0 | R4 | R4 = CB | 30° |
| 1 | 0 | 1 | 0 | 1 | 1 | 0 | 1 | 0 | R4 | R4 = CB | 30° |
| 1 | 0 | 1 | 0 | 1 | 1 | 1 | 0 | 0 | R4 | R4 = CB | 30° |
| 1 | 0 | 1 | 0 | 1 | 1 | 1 | 1 | 0 | R4 | R4 = CB | 30° |
| 1 | 0 | 0 | 1 | 1 | 0 | 0 | 0 | 0 | R5 | R5 = AB | 30° |
| 1 | 0 | 0 | 1 | 1 | 0 | 0 | 0 | 1 | R5 | R5 = AB | 30° |
| 1 | 0 | 0 | 1 | 1 | 0 | 0 | 1 | 0 | R5 | R5 = AB | 30° |
| 1 | 0 | 0 | 1 | 1 | 0 | 0 | 1 | 1 | R5 | R5 = AB | 30° |
| 1 | 0 | 0 | 1 | 1 | 0 | 1 | 0 | 0 | R5 | R5 = AB | 30° |
| 1 | 0 | 0 | 1 | 1 | 0 | 1 | 0 | 1 | R5 | R5 = AB | 30° |
| 1 | 0 | 0 | 1 | 1 | 0 | 1 | 1 | 0 | R5 | R5 = AB | 30° |
| 1 | 0 | 0 | 1 | 1 | 0 | 1 | 1 | 1 | R5 | R5 = AB | 30° |
| 1 | 0 | 0 | 1 | 1 | 1 | 0 | 0 | 0 | R5 | R5 = AB | 30° |
| 1 | 0 | 0 | 1 | 1 | 1 | 0 | 0 | 1 | R5 | R5 = AB | 30° |
| 1 | 0 | 0 | 1 | 1 | 1 | 0 | 1 | 0 | R5 | R5 = AB | 30° |
| 1 | 0 | 0 | 1 | 1 | 1 | 0 | 1 | 1 | R5 | R5 = AB | 30° |
| 1 | 0 | 0 | 1 | 1 | 1 | 1 | 0 | 0 | R5 | R5 = AB | 30° |
| 1 | 0 | 0 | 1 | 1 | 1 | 1 | 0 | 1 | R5 | R5 = AB | 30° |
| 1 | 0 | 0 | 1 | 1 | 1 | 1 | 1 | 0 | R5 | R5 = AB | 30° |
| 1 | 0 | 0 | 1 | 1 | 1 | 1 | 1 | 1 | R5 | R5 = AB | 30° |
| 1 | 0 | 1 | 1 | 1 | 0 | 0 | 0 | 0 | R5 | R5 = AB | 30° |
| 1 | 0 | 1 | 1 | 1 | 0 | 0 | 0 | 1 | R5 | R5 = AB | 30° |
| 1 | 0 | 1 | 1 | 1 | 0 | 0 | 1 | 0 | R5 | R5 = AB | 30° |
| 1 | 0 | 1 | 1 | 1 | 0 | 0 | 1 | 1 | R5 | R5 = AB | 30° |
| 1 | 0 | 1 | 1 | 1 | 0 | 1 | 0 | 0 | R5 | R5 = AB | 30° |
| 1 | 0 | 1 | 1 | 1 | 0 | 1 | 0 | 1 | R5 | R5 = AB | 30° |
| 1 | 0 | 1 | 1 | 1 | 0 | 1 | 1 | 0 | R5 | R5 = AB | 30° |
| 1 | 0 | 1 | 1 | 1 | 1 | 0 | 0 | 0 | R5 | R5 = AB | 30° |
| 1 | 0 | 1 | 1 | 1 | 1 | 0 | 0 | 1 | R5 | R5 = AB | 30° |
| 1 | 0 | 1 | 1 | 1 | 1 | 0 | 1 | 0 | R5 | R5 = AB | 30° |
| 1 | 0 | 1 | 1 | 1 | 1 | 1 | 0 | 0 | R5 | R5 = AB | 30° |
| 1 | 0 | 1 | 1 | 1 | 1 | 1 | 0 | 1 | R5 | R5 = AB | 30° |
| 1 | 0 | 1 | 1 | 1 | 1 | 1 | 1 | 0 | R5 | R5 = AB | 30° |
| 1 | 0 | 1 | 1 | 1 | 1 | 1 | 1 | 1 | R5 | R5 = AB | 30° |
| 1 | 1 | 0 | 1 | 1 | 0 | 0 | 0 | 0 | R5 | R5 = AB | 30° |
| 1 | 1 | 0 | 1 | 1 | 0 | 0 | 0 | 1 | R5 | R5 = AB | 30° |
| 1 | 1 | 0 | 1 | 1 | 0 | 0 | 1 | 0 | R5 | R5 = AB | 30° |
| 1 | 1 | 0 | 1 | 1 | 0 | 0 | 1 | 1 | R5 | R5 = AB | 30° |
| 1 | 1 | 0 | 1 | 1 | 0 | 1 | 0 | 0 | R5 | R5 = AB | 30° |
| 1 | 1 | 0 | 1 | 1 | 0 | 1 | 0 | 1 | R5 | R5 = AB | 30° |
| 1 | 1 | 0 | 1 | 1 | 0 | 1 | 1 | 0 | R5 | R5 = AB | 30° |
| 1 | 1 | 0 | 1 | 1 | 0 | 1 | 1 | 1 | R5 | R5 = AB | 30° |
| 1 | 1 | 0 | 1 | 1 | 1 | 0 | 0 | 0 | R5 | R5 = AB | 30° |
| 1 | 1 | 0 | 1 | 1 | 1 | 0 | 0 | 1 | R5 | R5 = AB | 30° |
| 1 | 1 | 0 | 1 | 1 | 1 | 0 | 1 | 0 | R5 | R5 = AB | 30° |
| 1 | 1 | 0 | 1 | 1 | 1 | 0 | 1 | 1 | R5 | R5 = AB | 30° |
| 1 | 1 | 0 | 1 | 1 | 1 | 1 | 0 | 0 | R1, R5 | R0 = AC | 90° |

TABLE 1-continued

| A | B | C | CBzc | ABzc | ACzc | BCzc | BAzc | CAzc | Possible Region | Detected Region | Max. Detection Error |
|---|---|---|------|------|------|------|------|------|-----------------|-----------------|----------------------|
| 1 | 1 | 0 | 1 | 1 | 1 | 1 | 0 | 1 | R1, R5 | R0 = AC | 90° |
| 1 | 1 | 0 | 1 | 1 | 1 | 1 | 1 | 0 | R1, R5 | R0 = AC | 90° |
| 1 | 1 | 0 | 1 | 1 | 1 | 1 | 1 | 1 | R1, R5 | R0 = AC | 90° |
| 0 | 1 | 0 | 0 | 0 | 0 | 0 | 0 | 0 | R0, R2 | R1 = BC | 90° |
| 0 | 1 | 0 | 0 | 0 | 0 | 0 | 0 | 1 | R0, R2 | R1 = BC | 90° |
| 0 | 1 | 0 | 1 | 0 | 0 | 0 | 0 | 0 | R0, R2 | R1 = BC | 90° |
| 0 | 1 | 0 | 1 | 0 | 0 | 0 | 0 | 1 | R0, R2 | R1 = BC | 90° |
| 0 | 1 | 1 | 0 | 0 | 1 | 1 | 1 | 1 | R1, R3 | R2 = BA | 90° |
| 0 | 1 | 1 | 0 | 1 | 1 | 1 | 1 | 1 | R1, R3 | R2 = BA | 90° |
| 0 | 1 | 1 | 1 | 0 | 1 | 1 | 1 | 1 | R1, R3 | R2 = BA | 90° |
| 0 | 1 | 1 | 1 | 1 | 1 | 1 | 1 | 1 | R1, R3 | R2 = BA | 90° |
| 0 | 0 | 1 | 0 | 0 | 0 | 0 | 0 | 0 | R2, R4 | R3 = CA | 90° |
| 0 | 0 | 1 | 0 | 0 | 1 | 0 | 0 | 0 | R2, R4 | R3 = CA | 90° |
| 0 | 0 | 1 | 0 | 1 | 0 | 0 | 0 | 0 | R2, R4 | R3 = CA | 90° |
| 0 | 0 | 1 | 0 | 1 | 1 | 0 | 0 | 0 | R2, R4 | R3 = CA | 90° |
| 1 | 0 | 1 | 1 | 1 | 0 | 0 | 1 | 1 | R3, R5 | R4 = CB | 90° |
| 1 | 0 | 1 | 1 | 1 | 0 | 1 | 1 | 1 | R3, R5 | R4 = CB | 90° |
| 1 | 0 | 1 | 1 | 1 | 1 | 0 | 1 | 1 | R3, R5 | R4 = CB | 90° |
| 1 | 0 | 1 | 1 | 1 | 1 | 1 | 1 | 1 | R3, R5 | R4 = CB | 90° |
| 1 | 0 | 0 | 0 | 0 | 0 | 0 | 0 | 0 | R0, R4 | R5 = AB | 90° |
| 1 | 0 | 0 | 0 | 0 | 0 | 1 | 0 | 0 | R0, R4 | R5 = AB | 90° |
| 1 | 0 | 0 | 0 | 0 | 1 | 0 | 0 | 0 | R0, R4 | R5 = AB | 90° |
| 1 | 0 | 0 | 0 | 0 | 1 | 1 | 0 | 0 | R0, R4 | R5 = AB | 90° |
| OTHER UNREACHABLE INPUTS | | | | | | | | | | UNDETERMINED | 180° |

What is claimed is:

1. A method for determining rotor position in a motor including a rotor and stator windings, comprising:
    driving a first pairing of the stator windings in a dummy cycle until a threshold current is exceeded;
    for each pairing of the stator windings,
        driving the pairing of stator windings,
        measuring an inductive sense value for the pairing of stator windings by determining a time for a current through the pairing of stator windings to reach the current threshold, and
        measuring a stator winding voltage value, induced by mutual inductance between the pairing of stator windings, for a third stator winding by performing a mutual inductance sensing routine on the motor; and
    determining the rotor position by accessing an entry in a table based on the inductive sense values and the stator winding voltage values.

2. A method for determining rotor position as defined in claim 1, wherein measuring the stator winding voltage value comprises determining if the stator winding voltage value is positive or negative.

3. A method for determining rotor position as defined in claim 1, wherein the motor includes three stator windings and wherein six inductive sense values are measured.

4. A method for determining rotor position as defined in claim 1, wherein the motor includes three stator windings and wherein six stator winding voltage values are measured.

5. A method for determining a rotor position as defined in claim 1, wherein measuring the voltage across the third stator winding comprises determining zero crossings of the voltage across the third winding.

6. A method for determining a rotor position as defined in claim 1, wherein determining the time for the current through the pairing of stator windings to reach the current threshold comprises sensing a voltage across a single sense resistor associated with the stator windings.

7. A method for determining a rotor position as defined in claim 1, wherein determining the time for the current through the pairing of stator windings to reach the current threshold comprises sensing a voltage across sense resistors associated with respective stator windings.

8. An apparatus for determining rotor position in a motor including a rotor and stator windings, the apparatus comprising:
    circuitry configured to
        drive a first pairing of the stator windings in a dummy cycle until a threshold current is exceeded, and
        for each pairing of the stator windings,
            drive the pairing of stator windings,
            measure an inductive sense value for the pairing of stator windings by determining a time for a current through the pairing of stator windings to reach the current threshold, and
            measure a stator winding voltage value, induced by mutual inductance between windings, for a third stator winding by performing a mutual inductance sensing routine on the motor; and
    processing circuitry configured to determine the rotor position values by accessing an entry in a table based on the inductive sense values and the stator winding voltage values.

9. The apparatus for determining rotor position as defined in claim 8, wherein the circuitry is configured to measure the stator winding voltage value by determining if the stator winding voltage value is positive or negative.

10. The apparatus for determining rotor position as defined in claim 8, wherein the motor includes three stator windings and wherein the circuitry is configured to measure six inductive sense values.

11. The apparatus for determining rotor position as defined in claim 8, wherein the motor includes three stator windings and wherein the circuitry is configured to measure six stator winding voltage values.

12. The apparatus for determining rotor position as defined in claim 8, wherein the circuitry is configured to measure the voltage across the third stator winding by determining zero crossings of the voltage across the third winding.

13. The apparatus for determining rotor position as defined in claim 8, wherein the circuitry is configured to determine the time for the current through the pairing of stator windings to reach the current threshold by sensing a voltage across a single sense resistor associated with the stator windings.

14. The apparatus for determining rotor position as defined in claim 8, wherein the circuitry is configured to determine the time for the current through the pairing of stator windings to reach the current threshold by sensing a voltage across sense resistors associated with respective stator windings.

* * * * *